United States Patent
Mori et al.

(10) Patent No.: US 9,876,427 B2
(45) Date of Patent: Jan. 23, 2018

(54) DC/DC POWER CONVERSION DEVICE WITH FIRST AND SECOND LOADS

(71) Applicant: TOYO ELECTRIC MFG. CO., LTD., Chuou-ku, Tokyo (JP)

(72) Inventors: Takao Mori, Yokohama (JP); Keiichi Uezono, Yokohama (JP); Shingo Makishima, Yokohama (JP)

(73) Assignee: TOYO ELECTRIC MFG. CO., LTD., Chuou-ku, Tokyo (JP)

( * ) Notice: Subject to any disclaimer, the term of this patent is extended or adjusted under 35 U.S.C. 154(b) by 0 days.

(21) Appl. No.: 15/122,238

(22) PCT Filed: Mar. 2, 2015

(86) PCT No.: PCT/JP2015/001086
§ 371 (c)(1),
(2) Date: Aug. 29, 2016

(87) PCT Pub. No.: WO2015/133118
PCT Pub. Date: Sep. 11, 2015

(65) Prior Publication Data
US 2016/0373008 A1   Dec. 22, 2016

(30) Foreign Application Priority Data
Mar. 4, 2014   (JP) ................. 2014-042062

(51) Int. Cl.
*H02M 3/158* (2006.01)
*H02M 1/14* (2006.01)
*H02M 1/00* (2006.01)

(52) U.S. Cl.
CPC ............. *H02M 3/158* (2013.01); *H02M 1/14* (2013.01); *H02M 3/1588* (2013.01); *H02M 2001/009* (2013.01); *Y02B 70/1466* (2013.01)

(58) Field of Classification Search
CPC .... H02M 3/156; H02M 3/158; H02M 3/1582; H02M 3/1588
(Continued)

(56) References Cited

U.S. PATENT DOCUMENTS

2005/0047039 A1\* 3/2005 Rajashekara ............. H02J 1/10
361/62
2007/0109822 A1\* 5/2007 Kuan ................... H02M 3/1588
363/21.14
(Continued)

FOREIGN PATENT DOCUMENTS

JP   2007288993 A   11/2007
JP   2010124596 A   6/2010

OTHER PUBLICATIONS

Introduction to Power Electronics (English translation of Japanese title), edited by Kawamura Atsuo, Corona Publishing Co., Ltd., Feb. 2009, pp. 57-83.
(Continued)

*Primary Examiner* — Jeffrey Sterrett
(74) *Attorney, Agent, or Firm* — Kenja IP Law PC

(57) ABSTRACT

Voltage applied to switching elements of a power conversion device is suppressed to be within a predetermined range. A power conversion device (1) includes a leg (31) in which switching elements (41, 42) are connected in series, a leg (32) in which switching elements (43, 44) are connected in series, a reactor (61) connected between the midpoint of the switching elements (41, 42) and the switching-element (43) end not connected to the switching element (44), a reactor (62) connected between the midpoint of the switching elements (43, 44) and the switching-element (42) end not connected to the switching element (41), and a DC power source (10) connected between the switching-element (41) end not connected to the reactor (61) and the terminal of the
(Continued)

switching element (44) not connected to the reactor (62). Loads can be connected in parallel to the legs (31, 32).

4 Claims, 9 Drawing Sheets

(58) Field of Classification Search
USPC .......................................... 323/271, 299, 351
See application file for complete search history.

(56) References Cited

U.S. PATENT DOCUMENTS

| | | | | |
|---|---|---|---|---|
| 2009/0134855 | A1* | 5/2009 | Landwehr | H02M 3/1584 |
| | | | | 323/272 |
| 2010/0135053 | A1* | 6/2010 | Morimoto | H02M 7/219 |
| | | | | 363/127 |
| 2012/0134180 | A1* | 5/2012 | Watanabe | H02M 3/1584 |
| | | | | 363/17 |
| 2014/0286071 | A1* | 9/2014 | Choi | H02J 7/0091 |
| | | | | 363/178 |
| 2016/0036323 | A1* | 2/2016 | She | H02M 3/156 |
| | | | | 307/29 |
| 2016/0072387 | A1* | 3/2016 | Schmalnauer | H02M 3/158 |
| | | | | 323/271 |
| 2016/0204703 | A1* | 7/2016 | Ishigaki | H02M 3/02 |
| | | | | 307/43 |
| 2016/0373008 | A1* | 12/2016 | Mori | H02M 3/158 |
| 2017/0012452 | A1* | 1/2017 | Kang | H02J 7/0068 |
| 2017/0163153 | A1* | 6/2017 | Lin | H02M 3/158 |

OTHER PUBLICATIONS

May 26, 2015, International Search Report issued in the International Patent Application No. PCT/JP2015/001086.

\* cited by examiner

DC/DC POWER CONVERSION DEVICE WITH FIRST AND SECOND LOADS

CROSS-REFERENCE TO RELATED APPLICATION

This application claims priority to and the benefit of Japanese Patent Application No. 2014-042062 filed Mar. 4, 2014, the entire contents of which are incorporated herein by reference.

TECHNICAL FIELD

This disclosure relates to a power conversion device that converts power from a DC power source to DC power of a different value.

BACKGROUND

A bi-directional chopper is a known example of a conventional power conversion device (for example, see Introduction to Power Electronics (English translation of Japanese title), edited by KAWAMURA Atsuo, Corona Publishing Co., Ltd., February, 2009, pp. 57-83 (NPL 1)). FIG. 10 is a circuit diagram of a conventional bi-directional chopper. The bi-directional chopper 2 converts DC voltage input from a DC power source in accordance with the ratio that a switching element 45 or 46 is on. In the case of using a step-down chopper, a DC power source is connected between terminals A and B, a load is connected between terminals C and D, the switching element 46 is always turned off, and the switching element 45 is subjected to switching control (on/off control). In this case, the output voltage is determined by the duty cycle (conduction ratio) of the switching element 45. On the other hand, in the case of using a step-up chopper, a load is connected between terminals A and B, a DC power source is connected between terminals C and D, the switching element 45 is always turned off, and the switching element 46 is subjected to switching control. In this case, the output voltage is determined by the duty cycle of the switching element 46.

In this bi-directional chopper 2, the power source voltage is applied to the switching element 46 when the switching element 45 is on, and the power source voltage is applied to the switching element 45 when the switching element 46 is on.

Furthermore, in the bi-directional chopper 2, the switching elements 45 and 46 can each be configured as two switching elements that are connected in series (for example, see JP 2010-124596 A (PTL 1)).

CITATION LIST

Patent Literature

PTL 1: JP 2010-124596 A

Non-Patent Literature

NPL 1: Introduction to Power Electronics (English translation of Japanese title), edited by KAWAMURA Atsuo, Corona Publishing Co., Ltd., February, 2009, pp. 57-83.

SUMMARY

Technical Problem

In the bi-directional chopper 2 illustrated in FIG. 10, however, the voltage applied to the switching elements 45 and 46 also increases when the power source voltage increases. Therefore, the withstand voltage of the switching elements 45 and 46 needs to be set to a value that takes into account the maximum increase in voltage of the power source voltage.

Furthermore, by adopting a configuration in which the switching elements 45 and 46 are each two switching elements connected in series, then although the voltage applied to each switching element is halved, the problem of the effect of an increase in the power source voltage cannot be solved. The increase in the number of switching elements also leads to an increase in circuit scale and in cost.

In general, a switching element with a low withstand voltage has less loss than a switching element with a high withstand voltage, and high-speed operations are possible. When the power source voltage increases, however, the voltage applied to the switching element also increases. Hence, a switching element with a low withstand voltage cannot be used. Unfortunately, therefore, it has not been possible to make a power conversion device highly efficient and compact.

It would therefore be helpful to provide a power conversion device that is highly efficient and compact by suppressing the voltage applied to the switching elements to within a predetermined range.

Solution to Problem

In order to resolve the aforementioned problem, a power conversion device according to this disclosure includes: a first leg in which a first switching element and a second switching element that are not on simultaneously are connected in series; a second leg in which a third switching element and a fourth switching element that are not on simultaneously are connected in series; a first reactor connected between a midpoint of the first switching element and the second switching element and a terminal of the third switching element not connected to the fourth switching element; a second reactor connected between a midpoint of the third switching element and the fourth switching element and a terminal of the second switching element not connected to the first switching element; and a DC power source connected between a terminal of the first switching element not connected to the first reactor and a terminal of the fourth switching element not connected to the second reactor; wherein a load is capable of being connected in parallel to the first leg and to the second leg.

In the power conversion device according to this disclosure, the first switching element may be subjected to switching control with a value $d_1$ determined by Formula (1) as a duty command value, and the fourth switching element may be subjected to switching control with a value $d_4$ determined by Formula (2) as a duty command value, $$d_1 = \frac{V_{O1}^* + V_{O2}^* - E}{V_{O1}^*}, \quad (1)$$

$$d_4 = \frac{V_{O1}^* + V_{O2}^* - E}{V_{O2}^*}, \quad (2)$$

where $V_{O1}^*$ is a voltage command value of both terminals of the first leg, $V_{O2}^*$ is a voltage command value of both terminals of the second leg, and E is a voltage of the DC power source.

In the power conversion device according to this disclosure, the first switching element may be subjected to switching control using, as a duty command value, a value yielded by subtracting a value proportional to a high frequency component of a current of the first reactor from the value $d_1$, and the fourth switching element may be subjected to switching control using, as a duty command value, a value yielded by subtracting a value proportional to a high frequency component of a current of the second reactor from the value $d_4$.

In the power conversion device according to this disclosure, the second switching element and the third switching element may be diodes.

Advantageous Effect

According to this disclosure, the voltage applied to the switching elements can be suppressed to within a predetermined range, thus allowing use of switching elements with low withstand voltage. As a result, a power conversion device that is highly efficient and compact can be provided.

DETAILED DESCRIPTION

Embodiments of this disclosure are described below in detail with reference to the drawings.

Embodiment 1

Figure 1:
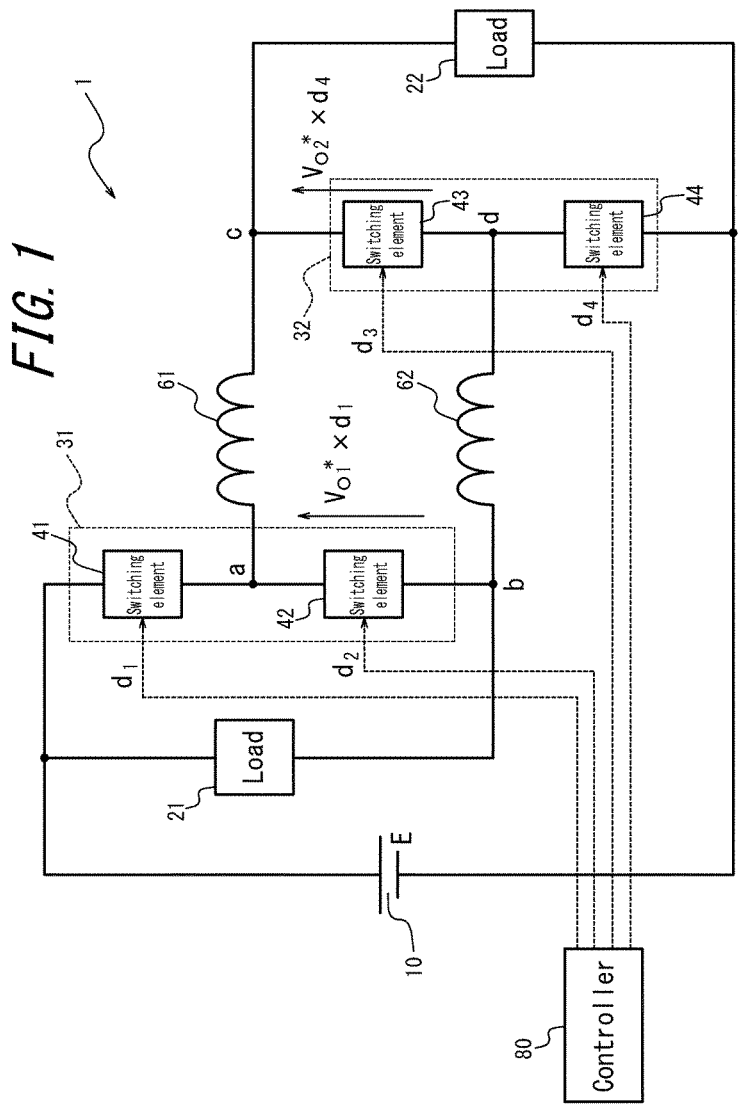
FIG. 1 is a circuit diagram illustrating a configuration example of a power conversion device according to Embodiment 1.

FIG. 1 is a circuit diagram illustrating a configuration example of a power conversion device according to Embodiment 1. In the example illustrated in FIG. 1, a power conversion device 1 includes a DC power source 10, a leg 31 (first leg) in which a switching element 41 (first switching element) and a switching element 42 (second switching element) are connected in series, a leg 32 (second leg) in which a switching element 43 (third switching element) and a switching element 44 (fourth switching element) are connected in series, a reactor 61 (first reactor), and a reactor 62 (second reactor). A controller 80 is connected to the power conversion device 1. A load 21 can be connected in parallel to the leg 31, and a load 22 can be connected in parallel to the leg 32.

Figure 2:
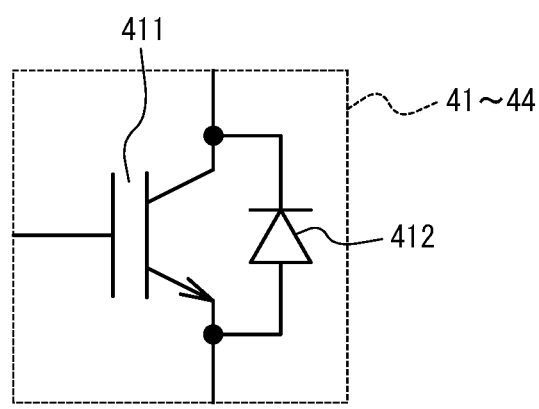
FIG. 2 illustrates a first example of a switching element used in the power conversion device according to Embodiment 1.

FIG. 2 illustrates an example of the switching elements 41 to 44. As illustrated in FIG. 2, the switching elements 41 to 44 include a switching element 411 that can be turned on and off, such as an IGBT, and a reflux diode 412. The switching element 41 and the switching element 42 are not turned on at the same time, nor are the switching elements 43 and 44 turned on at the same time.

Figure 3:
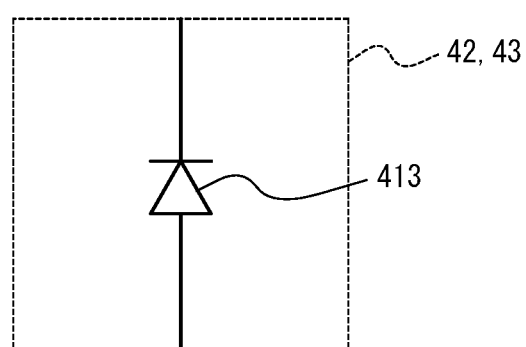
FIG. 3 illustrates a second example of a switching element used in the power conversion device according to Embodiment 1.

FIG. 3 illustrates another example of the switching elements 42 and 43. In the switching elements 42 and 43, the switching element 411 illustrated in FIG. 2 may always be turned off, and it is possible to use only the diode 413 as illustrated in FIG. 3.

The reactor 61 is connected between the midpoint of the switching element 41 and the switching element 42 and the terminal of the switching element 43 that is not connected to the switching element 44. The reactor 62 is connected between the midpoint of the switching element 43 and the switching element 44 and the terminal of the switching element 42 that is not connected to the switching element 41.

The DC power source 10 is connected between the terminal of the switching element 41 not connected to the reactor 61 and the terminal of the switching element 44 not connected to the reactor 62.

Figure 4:
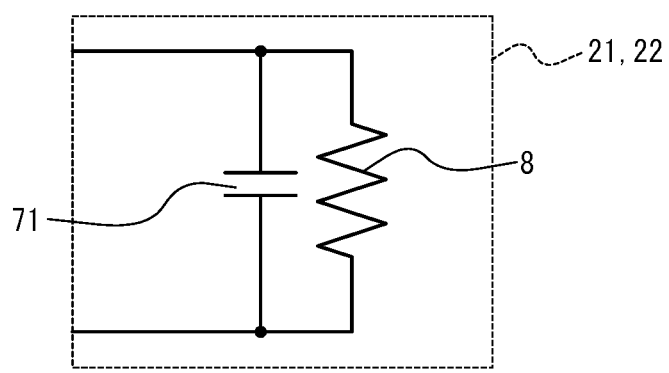
FIG. 4 illustrates a first example of a load connected to the power conversion device according to Embodiment 1.
Figure 5:
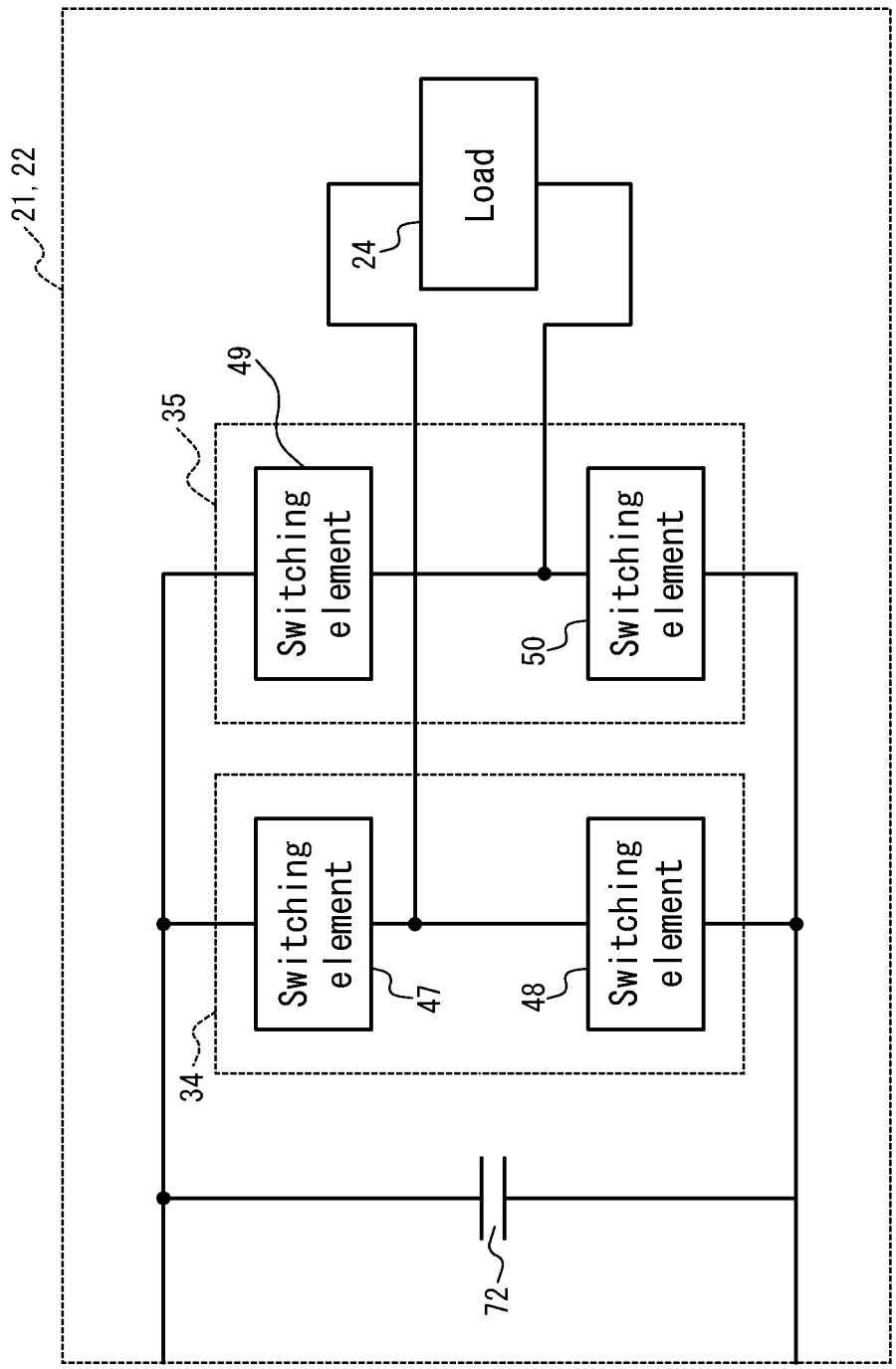
FIG. 5 illustrates a second example of a load connected to the power conversion device according to Embodiment 1.

FIGS. 4 and 5 illustrate an example of the loads 21 and 22. For example as illustrated in FIG. 4, the loads 21 and 22 may be a resistance load in which a capacitor 71 and a resistor 8 are connected in parallel, or as illustrated in FIG. 5, an inverter including a leg 34 in which switching elements 47 and 48 are connected in series, a leg 35 in which switching elements 49 and 50 are connected in series, a capacitor 72, and a load 24. Also, one of the loads 21 and 22 may be the load illustrated in FIG. 4, with the other being the load illustrated in FIG. 5. The configuration of the loads 21 and 22 is of course not limited to these examples.

The controller 80 determines duty command values $d_1$ to $d_4$ of the switching elements 41 to 44, and the switching elements 41 to 44 are subjected to switching control based on the duty command values $d_1$ to $d_4$. The voltage between terminals ab of the switching element 42 is $V_{O1}^* \times d_1$ and the voltage between terminals cd of the switching element 43 is $V_{O2}^* \times d_4$, where $V_{O1}^*$ is the voltage command value of the inter-terminal voltage (first output voltage) of the leg 31, $V_{O2}^*$ is the voltage command value of the inter-terminal voltage (second output voltage) of the leg 32, and E is the voltage of the DC power source 10. The potential of terminal a is $E - V_{O1}^* + V_{O1}^* \times d_1$.

In order to keep the voltage command values $V_{O1}^*$ and $V_{O2}^*$ constant even when the voltage E varies, the controller 80 preferably performs control so that the potentials of terminals a and c are equivalent and so that the potentials of terminals b and d are equivalent. In this case, the duty command values $d_1$ and $d_4$ are calculated by Formulas (1) and (2). In order to satisfy Formulas (1) and (2), however, the relationship $E \leq V_{O1}^* + V_{O2}^* \leq 2E$ needs to hold.

$$d_1 = \frac{V_{O1}^* + V_{O2}^* - E}{V_{O1}^*} \qquad (1)$$

$$d_4 = \frac{V_{O1}^* + V_{O2}^* - E}{V_{O2}^*} \qquad (2)$$

The switching elements 41 and 42 of the leg 31 are not on simultaneously, the switching elements 43 and 44 of the leg 32 are not on simultaneously, and the duty command values $d_2$ and $d_3$ satisfy Formulas (3) and (4). For example, $d_2=d_3=0$ may be achieved by always keeping the switching elements 42 and 43 off, or by using a diode.

$$0 \le d_2 \le 1-d_1 \quad (3)$$

$$0 \le d_3 \le 1-d_4 \quad (4)$$

By having the above-described configuration, the power conversion device 1 can maintain the voltage between terminals of the leg 31 at $V_{O1}^*$ and the voltage between terminals of the leg 32 at $V_{O2}^*$ as long as $E \le V_{O1}^* + V_{O2}^*$, even if the voltage E of the DC power source 10 rises. Since the voltages $V_{O1}^*$ and $V_{O2}^*$ are a stepped-down voltage of the voltage E, switching elements 41 to 44 with low withstand voltage can be used, thereby allowing the power conversion device 1 to be made more efficient and compact.

Embodiment 2

Figure 6:
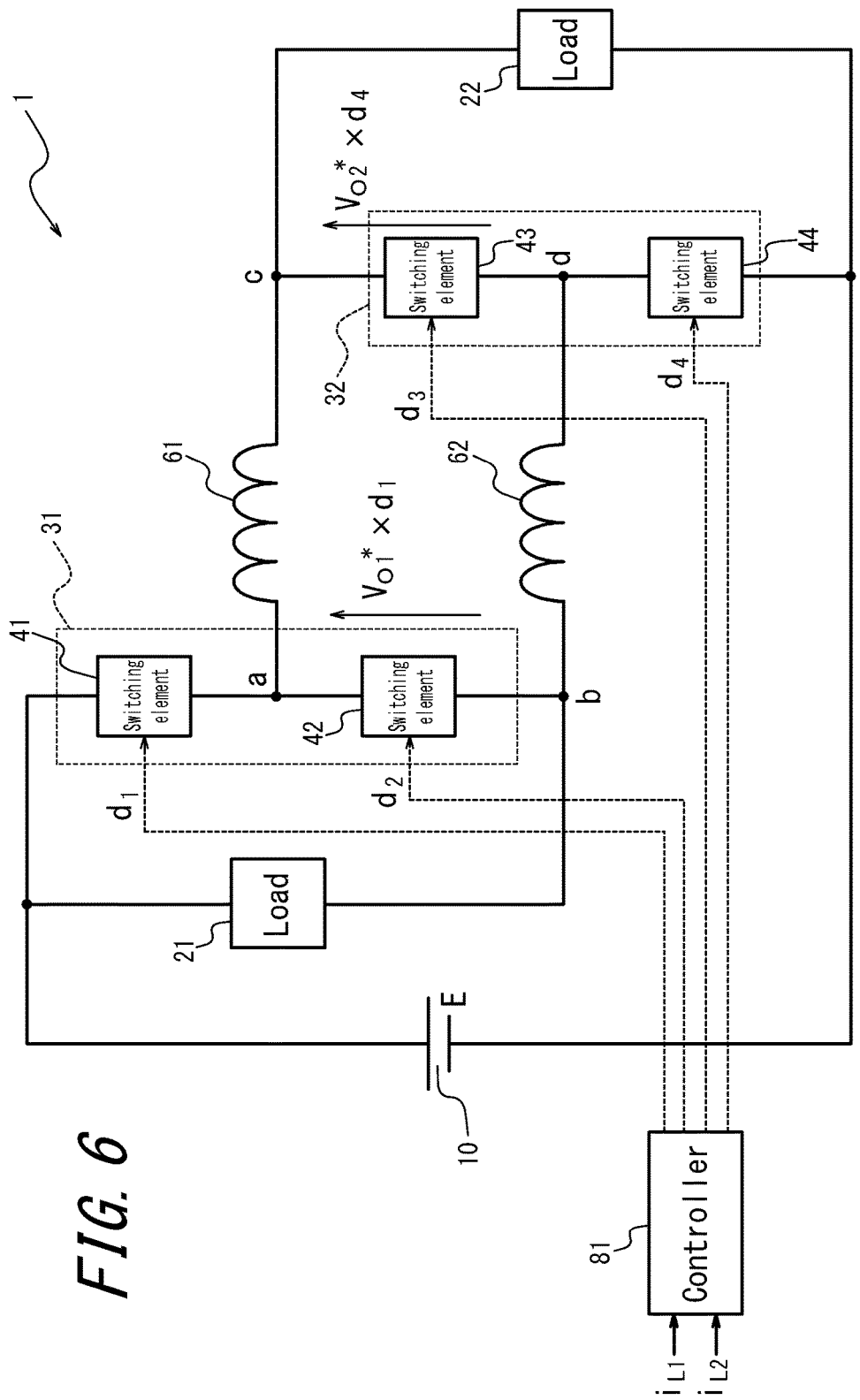
FIG. 6 is a circuit diagram illustrating a configuration example of a power conversion device according to Embodiment 2.

Next, Embodiment 2 is described. FIG. 6 is a circuit diagram illustrating a configuration example of a power conversion device according to Embodiment 2. The configuration of the power conversion device is the same as that of Embodiment 1 illustrated in FIG. 1. As compared to Embodiment 1, only the configuration of the controller differs.

Figure 7:
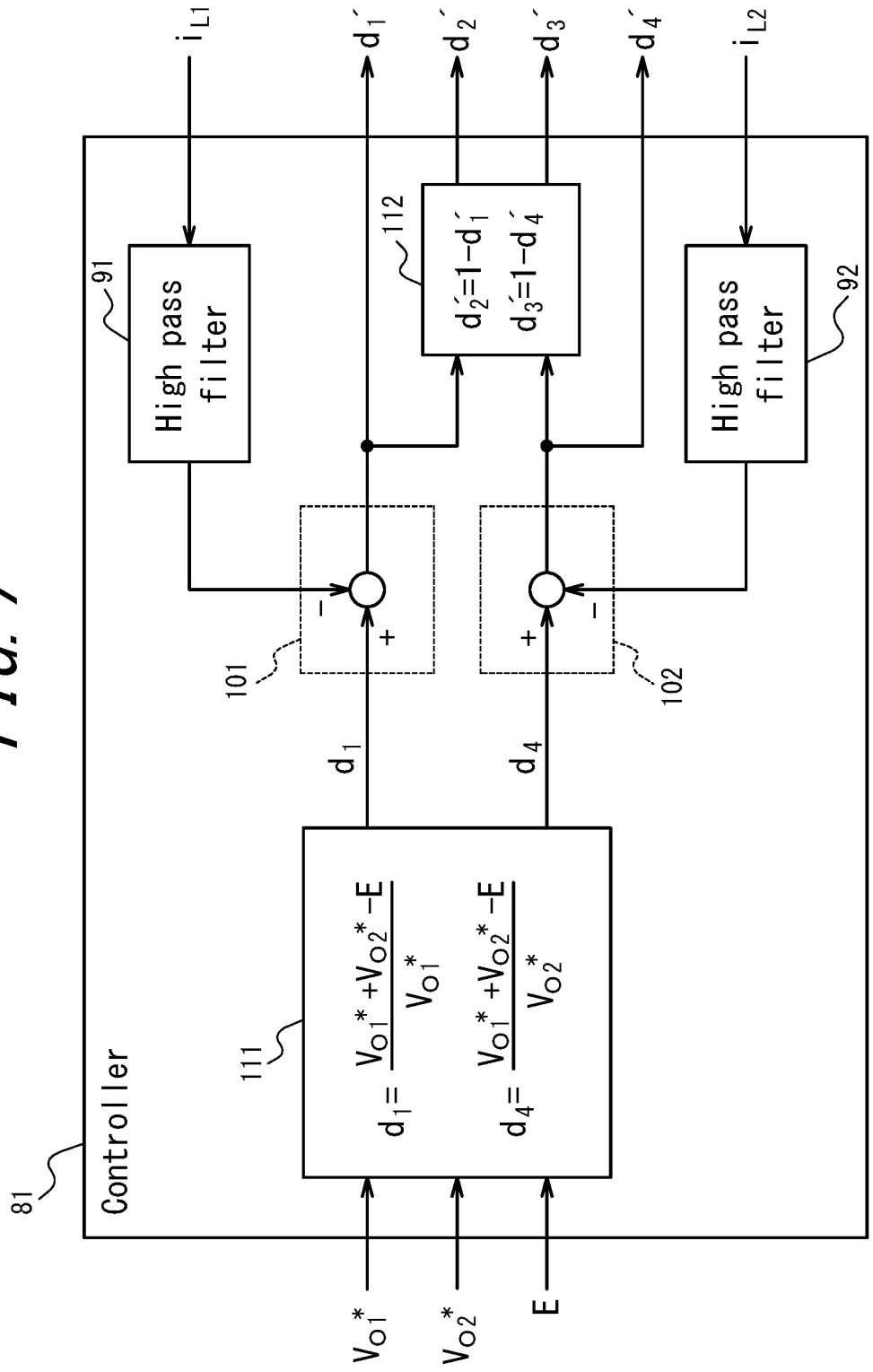
FIG. 7 is a block diagram illustrating a configuration example of a controller in the power conversion device according to Embodiment 2.

FIG. 7 is a block diagram illustrating a configuration example of a controller 81. In this example, the controller 81 includes high pass filters 91 and 92, subtractors 101 and 102, and duty command value generators 111 and 112.

The duty command value generator 111 generates the duty command value $d_1$ based on the above-described Formula (1) and outputs the result to the subtractor 101. The duty command value generator 111 also generates the duty command value $d_4$ based on the above-described Formula (2) and outputs the result to the subtractor 102.

The high pass filter 91 receives input of current iLi of the reactor 61, seeks a high-frequency component $HPF[i_{L1}]$ yielded by removing the steady component from the current $i_{L1}$, and outputs a value $K_1 \cdot HPF[i_{L1}]$ that is proportional to $HPF[i_{L1}]$ to the subtractor 101. The subtractor 101 calculates a duty command value $d_1'$ for the switching element 41 by subtracting $K_1 \cdot HPF[i_{L1}]$, which is the output value of the high pass filter 91, from the duty command value $d_1$, which is the output value of the duty command value generator 111. In other words, the duty command value $d_1'$ is calculated by the following Formula (5).

$$d_1' = \frac{V_{O1}^* + V_{O2}^* - E}{V_{O1}^*} - K_1 \cdot HPF[i_{L1}] \quad (5)$$

By Formula (6), the duty command value generator 112 calculates the duty command value $d_2'$ for the switching element 42. In the figures, the case of $d_2'=1-d_1'$ is illustrated as an example.

$$0 \le d_2' \le 1-d_1' \quad (6)$$

Similarly, the high pass filter 92 receives input of current $i_{L2}$ of the reactor 62, seeks a high-frequency component $HPF[i_{L2}]$ yielded by removing the steady component from the current $i_{L2}$, and outputs a value $K_2 \cdot HPF[i_{L2}]$ that is proportional to $HPF[i_{L2}]$ to the subtractor 102. The subtractor 102 calculates a duty command value $d_4'$ for the switching element 44 by subtracting $K_2 \cdot HPF[i_{L2}]$, which is the output value of the high pass filter 92, from the duty command value $d_4$, which is the output value of the duty command value generator 111. In other words, the duty command value $d_4'$ is calculated by the following Formula (7).

$$d_4' = \frac{V_{O1}^* + V_{O2}^* - E}{V_{O2}^*} - K_2 \cdot HPF[i_{L2}] \quad (7)$$

By Formula (8), the duty command value generator 112 calculates the duty command value $d_3'$ for the switching element 43. In the figures, the case of $d_3'=1-d_4'$ is illustrated as an example.

$$0 \le d_3' \le 1-d_4' \quad (8)$$

In cases such as using the inverter illustrated in FIG. 5 as a load, the voltage supplied to the loads 21 and 22 oscillates in accordance with the characteristics of the loads, but according to this embodiment, the generated oscillation can be suppressed.

Figure 8A:
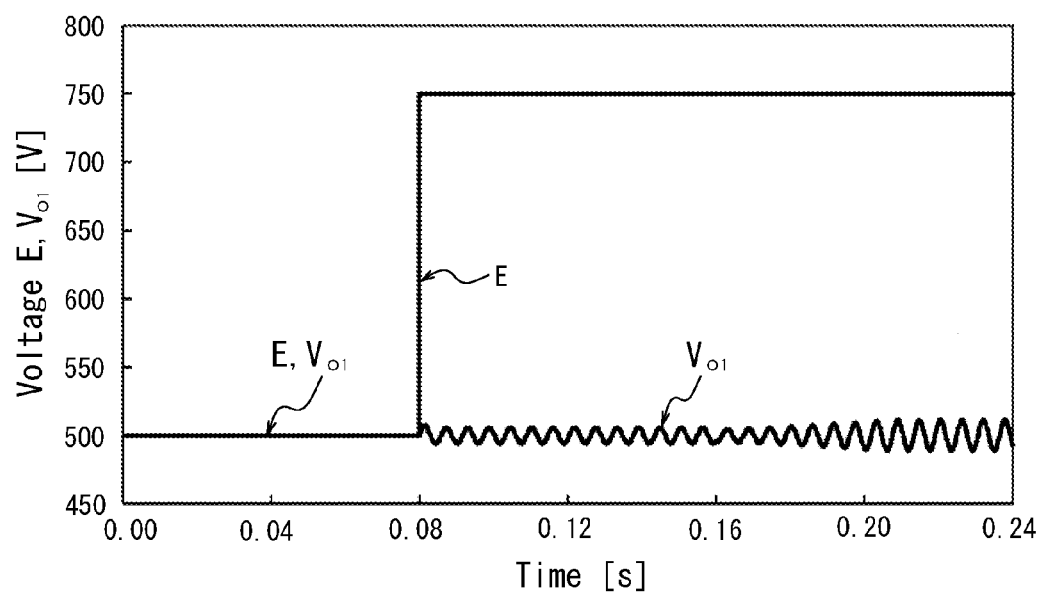
FIGS. 8A and 8B illustrate a simulation waveform of output voltage and inductor current of the power conversion device according to Embodiment 1.
Figure 8B:
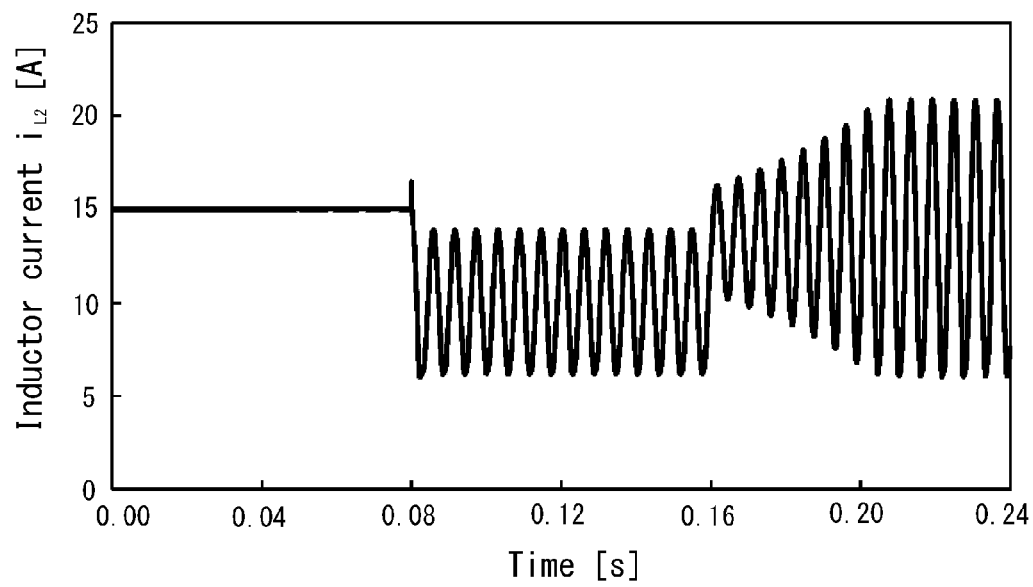

In order to illustrate the effects of the power conversion device 1 according to Embodiment 2, a simulation waveform of the power conversion device 1 according to Embodiment 1 is first illustrated in FIGS. 8A and 8B. The simulation conditions were inductance of the reactors 61 and 62 of 2 mH, a switching frequency of 5 kHz, and an output voltage command of $V_{O1}^*=V_{O2}^*=500$ V. The loads 21 and 22 included capacitors connected in parallel to the respective legs 31 and 32, and the capacitance of these capacitors was 940 μF. The simulation waveform illustrates the power source voltage E, the output voltage $V_{O1}$ of the leg 31, and the current $i_{L2}$ flowing in the reactor 62 when the voltage E of the DC power source 10 is caused to change from 500 V to 750 V at 0.08 s, and the load power consumption is caused to change from 7.5 kW to 10 kW at 0.16 s. With regard to the inductor current, the moving average was taken in order to remove the switching ripple component. FIGS. 8A and 8B confirm that after the change in power source voltage and load power consumption, the output voltage follows the voltage command value. After the change in power source voltage and load power consumption, however, both the voltage and current continue to oscillate.

Figure 9A:
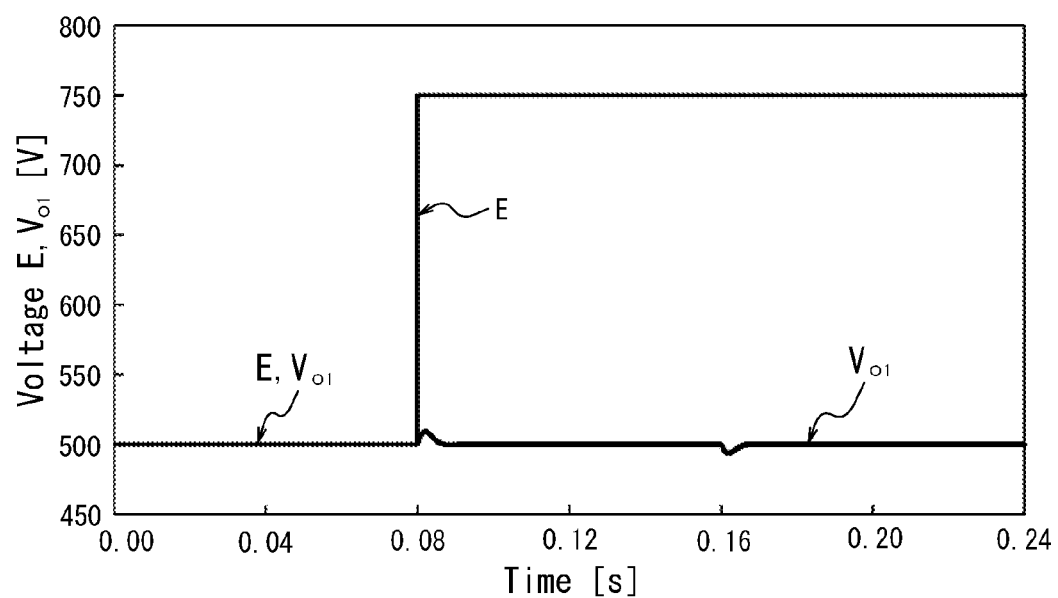
FIGS. 9A and 9B illustrate a simulation waveform of output voltage and inductor current of the power conversion device according to Embodiment 2.
Figure 9B:
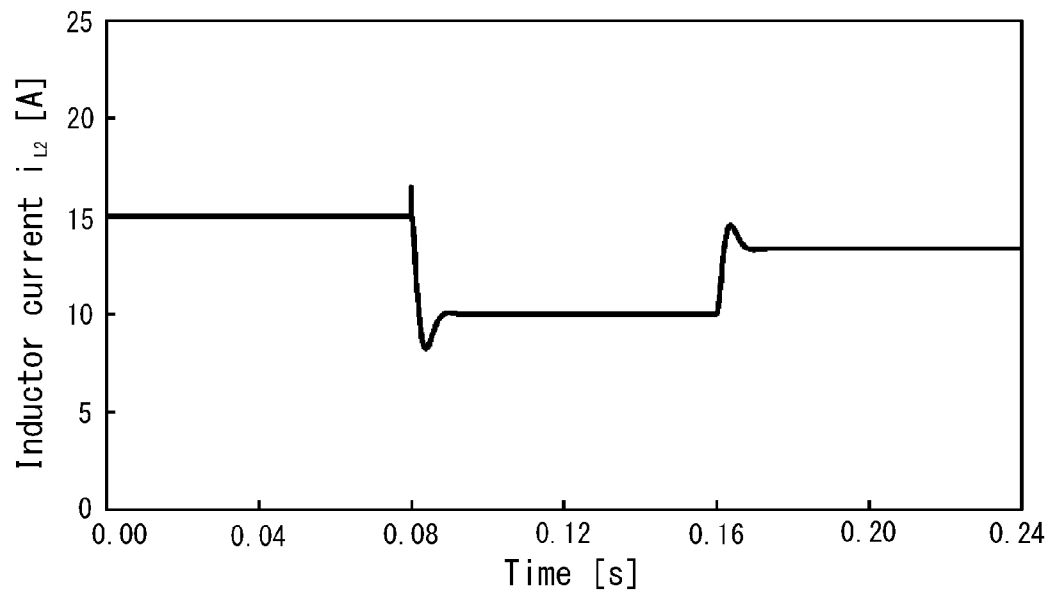
Figure 10:
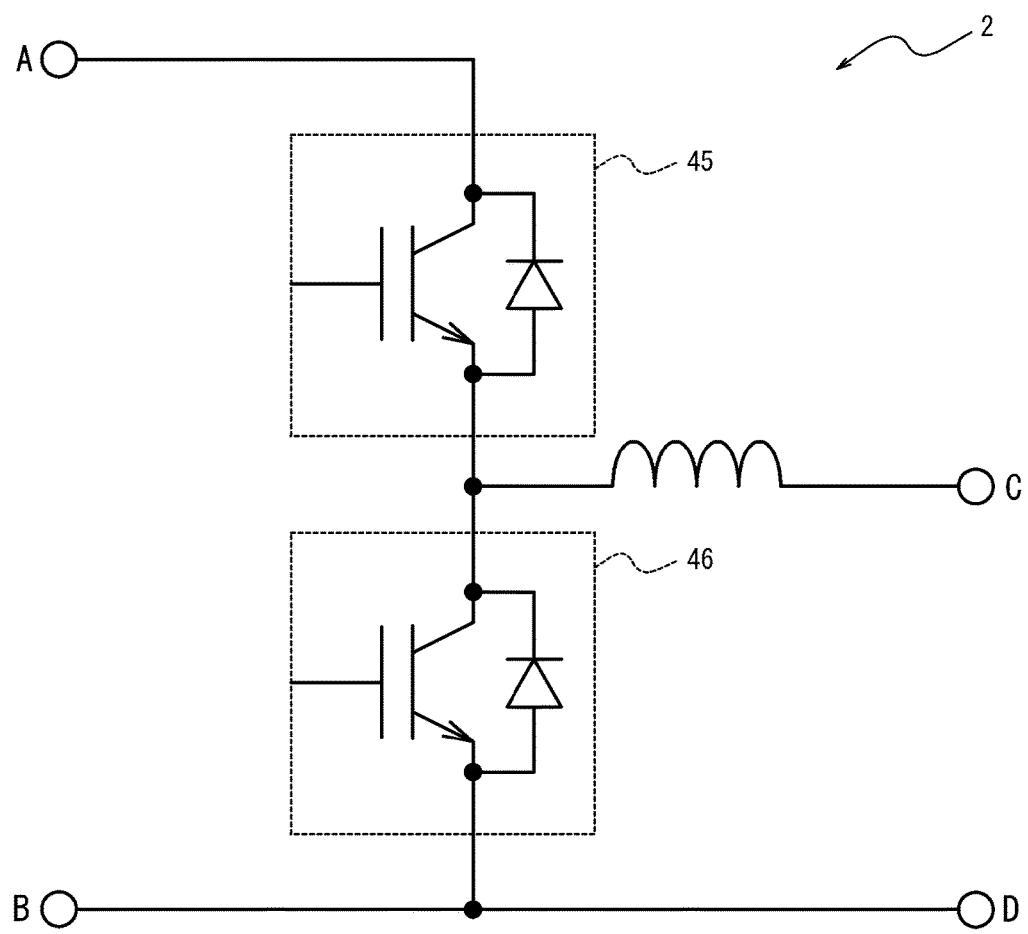
FIG. 10 is a circuit diagram of a bi-directional chopper that is an example of a conventional power conversion device.

FIGS. 9A and 9B illustrate a simulation waveform when, under the same conditions as above, the cutoff frequency of the high pass filters 91 and 92 is 50 Hz, and $K_1=K_2=0.005$. FIGS. 9A and 9B confirm that by performing control with the controller 81, oscillation is suppressed upon a change in the power source voltage and the load power consumption, and the output voltage specified by the command value can be obtained in a stable state.

Although the above embodiments have been described as representative examples, many modifications and substitutions within the spirit and scope of this disclosure will be apparent to those of ordinary skill in the art. Accordingly, this disclosure should not be interpreted as being limited to the above embodiments, and a variety of changes and modifications may be made without departing from the scope of the patent claims. For example, a plurality of the constituent blocks in the embodiments may be combined into one, or one constituent block may be divided.

INDUSTRIAL APPLICABILITY

This disclosure is highly useful, as it may be applied to power conversion devices that convert a DC power source to DC power of a different voltage and current and may be used in a variety of industrial fields that use power.

REFERENCE SIGNS LIST

1 Power conversion device
10 DC power source
21, 22 Load
31 Leg (first leg)
32 Leg (second leg)
41 Switching element (first switching element)
42 Switching element (second switching element)
43 Switching element (third switching element)
44 Switching element (fourth switching element)
61 Reactor (first reactor)
62 Reactor (second reactor)
80, 81 Controller
91, 92 High pass filter
101, 102 Subtractor
111, 112 Duty command value generator
411 Switching element
412 Reflux diode
413 Diode

The invention claimed is:

1. A power conversion device comprising:
a first leg in which a first switching element and a second switching element that are not on simultaneously are connected in series;
a second leg in which a third switching element and a fourth switching element that are not on simultaneously are connected in series;
a first reactor connected between a midpoint of the first switching element and the second switching element and a terminal of the third switching element not connected to the fourth switching element;
a second reactor connected between a midpoint of the third switching element and the fourth switching element and a terminal of the second switching element not connected to the first switching element; and
a DC power source connected between a terminal of the first switching element not connected to the first reactor and a terminal of the fourth switching element not connected to the second reactor; wherein
a first load is capable of being connected in parallel to the first leg and a second load is capable of being connected in parallel to the second leg, and
the first switching element is subjected to switching control with a value $d_1$ determined by Formula (1) as a duty command value, and the fourth switching element is subjected to switching control with a value $d_4$ determined by Formula (2) as a duty command value, $$d_1 = \frac{V_{O1}^* + V_{O2}^* - E}{V_{O1}^*}, \quad (1)$$

$$d_4 = \frac{V_{O1}^* + V_{O2}^* - E}{V_{O2}^*}, \quad (2)$$

where $V_{O1}^*$ is a voltage command value of both terminals of the first leg, $V_{O2}^*$ is a voltage command value of both terminals of the second leg, and E is a voltage of the DC power source.

2. The power conversion device of claim 1, wherein the second switching element and the third switching element are diodes.

3. The power conversion device of claim 1, wherein
the first switching element is subjected to switching control using, as a duty command value, a value yielded by subtracting a value proportional to a high frequency component of a current of the first reactor from the value $d_1$, and
the fourth switching element is subjected to switching control using, as a duty command value, a value yielded by subtracting a value proportional to a high frequency component of a current of the second reactor from the value $d_4$.

4. The power conversion device of claim 3, wherein the second switching element and the third switching element are diodes.

* * * * *